US012533272B2

(12) United States Patent
Emfinger et al.

(10) Patent No.: US 12,533,272 B2
(45) Date of Patent: Jan. 27, 2026

(54) SELF-ALIGNING COLLAPSIBLE FRONT ADD-ON FOR A WHEELCHAIR

(71) Applicant: PERMOBIL, INC., Lebanon, TN (US)

(72) Inventors: William Alexander Emfinger, Nashville, TN (US); Benjamin William Gasser, Nashville, TN (US); Benjamin Phillip Hemkens, Nashville, TN (US)

(73) Assignee: PERMOBIL, INC., Lebanon, TN (US)

( * ) Notice: Subject to any disclaimer, the term of this patent is extended or adjusted under 35 U.S.C. 154(b) by 930 days.

(21) Appl. No.: 17/556,078

(22) Filed: Dec. 20, 2021

(65) Prior Publication Data

US 2023/0190547 A1 Jun. 22, 2023

(51) Int. Cl.
*A61G 5/02* (2006.01)
*A61G 5/04* (2013.01)

(52) U.S. Cl.
CPC ............. *A61G 5/027* (2013.01); *A61G 5/045* (2013.01)

(58) Field of Classification Search
CPC .......... A61G 5/027; A61G 5/045; A61G 5/02; A61G 5/04
See application file for complete search history.

(56) References Cited

U.S. PATENT DOCUMENTS 565,718 A 8/1896 Boardman
588,495 A 8/1897 Smith
1,794,796 A 3/1931 Reichert et al.
2,192,282 A 3/1940 Warner
2,448,992 A 9/1948 Love et al.
2,495,573 A 1/1950 Duke
2,548,274 A 4/1951 Oeveren
2,978,053 A 4/1961 Schmidt
3,794,132 A 2/1974 Moon
(Continued)

FOREIGN PATENT DOCUMENTS

DE 202015103690 U1 7/2015
DE 202023103150 U1 6/2023
(Continued)

OTHER PUBLICATIONS

International Search Report and Written Opinion for Application No. PCT/US2022/053355 dated Apr. 6, 2023 (13 pages).
(Continued)

*Primary Examiner* — Valentin Neacsu
*Assistant Examiner* — Michael R Stabley
(74) *Attorney, Agent, or Firm* — Michael Best & Friedrich LLP

(57) ABSTRACT

An alignment system for a wheelchair based steering column includes a fork assembly configured to carry a front wheel, a bearing coupled to the fork assembly, a tube member that receives the bearing and a portion of the fork assembly, a cam defining sloped cam surface leading to a recess, the cam positioned in the tube member, a biasing member configured to apply a restoring force onto the cam, the biasing member positioned in the tube member, and a steering device coupled to the fork assembly. In response to applying a rotational force to the steering device, the fork assembly rotates, responsively rotating the front wheel and sliding the bearing along the cam surface away from the recess, the cam responsively linearly translates relative to the fork assembly overcoming the restoring force.

18 Claims, 15 Drawing Sheets

(56) References Cited

U.S. PATENT DOCUMENTS

| | | | | |
|---|---|---|---|---|
| 3,912,032 | A | 10/1975 | Benz et al. | |
| 3,921,744 | A | 11/1975 | Benoit et al. | |
| 4,475,613 | A | 10/1984 | Walker | |
| 4,503,925 | A | 3/1985 | Palmer et al. | |
| 4,592,563 | A | 6/1986 | Dean et al. | |
| 4,759,418 | A | 7/1988 | Goldenfeld et al. | |
| 5,135,063 | A | 8/1992 | Kropf | |
| 5,221,100 | A | 6/1993 | McNutt | |
| 5,509,674 | A | 4/1996 | Browning | |
| 5,651,422 | A | 7/1997 | Casali | |
| 5,899,475 | A | 5/1999 | Verhaeg et al. | |
| 6,766,871 | B2 | 7/2004 | Sawyer | |
| 7,117,967 | B2 * | 10/2006 | Kidd | A61G 5/1051 180/209 |
| 7,140,621 | B2 | 11/2006 | Cheng | |
| 7,216,728 | B2 | 5/2007 | Huang et al. | |
| 8,079,604 | B2 | 12/2011 | Newton | |
| 9,302,730 | B2 | 4/2016 | Takenaka et al. | |
| 9,326,901 | B2 | 5/2016 | Conte | |
| 9,603,764 | B2 | 3/2017 | Turturro et al. | |
| 9,795,524 | B2 * | 10/2017 | Richter | A61G 5/047 |
| 9,872,805 | B2 | 1/2018 | Bach Castillo | |
| 9,987,546 | B1 | 6/2018 | Clos et al. | |
| 9,993,378 | B2 | 6/2018 | Turturro et al. | |
| 10,112,675 | B2 | 10/2018 | Takenaka et al. | |
| 10,130,531 | B1 | 11/2018 | Laconis | |
| 10,238,952 | B2 | 3/2019 | Clos et al. | |
| 10,463,547 | B2 * | 11/2019 | Kano | A61G 5/1059 |
| 10,543,866 | B2 | 1/2020 | Araki et al. | |
| 10,583,888 | B2 | 3/2020 | Araki et al. | |
| 2005/0236194 | A1 | 10/2005 | Kidd et al. | |
| 2009/0066150 | A1 | 3/2009 | O'Rourke, Sr. | |
| 2011/0095508 | A1 | 4/2011 | Chiu | |
| 2011/0241301 | A1 | 10/2011 | Duvivier | |
| 2011/0308880 | A1 | 12/2011 | Chiu | |
| 2013/0008732 | A1 | 1/2013 | Richter | |
| 2014/0225346 | A1 * | 8/2014 | Bettin | B62K 19/32 280/236 |
| 2014/0262575 | A1 | 9/2014 | Ritcher | |
| 2016/0137254 | A1 * | 5/2016 | Lee | B60K 1/04 180/208 |
| 2017/0327178 | A1 * | 11/2017 | Sotir | B62K 15/008 |
| 2017/0361893 | A1 * | 12/2017 | Lee | B62K 11/02 |
| 2018/0147100 | A1 | 5/2018 | Conte | |
| 2018/0338877 | A1 * | 11/2018 | Kano | B62K 5/025 |
| 2019/0015272 | A1 * | 1/2019 | Benedini | A61G 5/1051 |
| 2019/0023347 | A1 * | 1/2019 | Block | B62K 5/06 |
| 2019/0217915 | A1 | 7/2019 | Clos et al. | |
| 2019/0375380 | A1 * | 12/2019 | Wood | A47L 1/16 |
| 2020/0000657 | A1 | 1/2020 | Kim et al. | |
| 2020/0000658 | A1 * | 1/2020 | Klein | A61G 5/047 |
| 2020/0008990 | A1 | 1/2020 | Harrison | |
| 2021/0206448 | A1 * | 7/2021 | Dukoff | B62K 3/002 |
| 2021/0380192 | A1 * | 12/2021 | Demond | B62H 1/08 |
| 2022/0204116 | A1 * | 6/2022 | Lin | B62K 3/10 |

FOREIGN PATENT DOCUMENTS

| | | | |
|---|---|---|---|
| DE | 202023103152 | U1 | 6/2023 |
| EP | 0625434 | A1 | 11/1994 |
| EP | 1927331 | A1 | 6/2008 |
| EP | 1911428 | B1 | 6/2011 |
| EP | 3053563 | A1 | 8/2016 |
| EP | 3173056 | A1 | 5/2017 |
| EP | 3058922 | B1 | 12/2017 |
| EP | 3415410 | A1 | 12/2018 |
| EP | 3434244 | A1 | 1/2019 |
| EP | 3501469 | A1 | 6/2019 |
| EP | 3622930 | A2 | 3/2020 |
| EP | 3622931 | B1 | 4/2021 |
| EP | 3501468 | B1 | 9/2021 |
| JP | 2001340391 | A | 12/2001 |
| JP | 2006167232 | A | 6/2006 |
| WO | 02085645 | A1 | 10/2002 |
| WO | 2017081475 | A1 | 5/2017 |
| WO | 2017199116 | A1 | 11/2017 |

OTHER PUBLICATIONS

Invitation to Pay Additional Fees for International Application No. PCT/US2022/053352 dated Apr. 18, 2023 (11 pages).

Invitation to Pay Additional Fees for International Application No. PCT/US2022/053350 dated Apr. 28, 2023 (10 pages).

International Search Report and Written Opinion for Application No. PCT/US2022/053350 dated Jul. 4, 2023 (19 pages).

International Search Report and Written Opinion for Application No. PCT/US2022/053352 dated Jul. 7, 2023 (19 pages).

* cited by examiner

SELF-ALIGNING COLLAPSIBLE FRONT ADD-ON FOR A WHEELCHAIR

FIELD OF THE DISCLOSURE

The present disclosure relates to an add-on for a manual wheelchair. More specifically, the present disclosure relates to a removable steering assembly for the wheelchair that is operable by a user, that is configured to self-align, and is collapsible to facilitate improved storage and transport when not attached to the wheelchair.

BACKGROUND

Add-on hand bikes for a wheelchair are generally known in the art. These devices are motorized hand bikes that attach to a front of the wheelchair. Generally, these devices include a handlebar, a front wheel, and a motor all positioned in the add-on. As such, all of these components are in front of the wheelchair user. Unfortunately, these add-on hand bikes have substantial limitations. They are very heavy, because the motorization system, along with the handlebar and front wheel, are all integrated into the add-on. Accordingly, it can be very difficult for certain wheelchair users to manipulate, attach, and/or detach the hand bike from the front of the wheelchair. Add-on hand bikes can also have complex systems for mounting (or attaching) the hand bike to the wheelchair. This can be cumbersome for a wheelchair user to attach and detach the hand bike to the wheelchair. Accordingly, there is a need for an add-on that easily attaches and detaches to a wheelchair, self-aligns to provide a user assistance while steering, and is collapsible to reduce a storage footprint when not attached to the wheelchair.

SUMMARY

In one embodiment, an alignment system for a wheelchair based steering column includes a fork assembly configured to carry a front wheel, a bearing coupled to the fork assembly, a tube member that receives the bearing and a portion of the fork assembly, a cam defining sloped cam surface leading to a recess, the cam positioned in the tube member, a biasing member configured to apply a restoring force onto the cam, the biasing member positioned in the tube member, and a steering device coupled to the fork assembly. In response to applying a rotational force to the steering device, the fork assembly rotates, responsively rotating the front wheel and sliding the bearing along the cam surface away from the recess the cam responsively linearly translates relative to the fork assembly overcoming the restoring force. In addition, in response to removal of the rotational force to the steering device, the biasing member reapplies the restoring force to the cam, responsively sliding the bearing along the cam surface into the recess and rotating the fork assembly and the front wheel into an aligned configuration.

In another embodiment, a steering assembly for a wheelchair includes a frame assembly defining a first end opposite a second end, a hinge positioned in the frame assembly between the first and second ends, and a steering device including a front wheel, the steering device coupled to the first end of the frame assembly. The hinge is configured to pivot between a first configuration, where the frame assembly is in an operational configuration, and a second configuration, where the frame assembly is in a collapsed configuration.

In another embodiment, a steering assembly for a wheelchair includes a frame assembly, a steering device coupled to the frame assembly, the steering device including a handlebar operably connected to a front wheel by a steering shaft, and a hinge positioned in the steering shaft between the handlebar and the front wheel. The hinge is configured to pivot between a closed position, where the steering shaft is in an operational configuration, and an open position, where the steering shaft is in a collapsed configuration.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The present disclosure is directed to an embodiment of a steering assembly 100 that is configured to selectively attach (or selectively couple) to a wheelchair 10. The steering assembly 100 is configured to be positioned at a front of the wheelchair 10 for user operation. The steering assembly 100 selectively couples to a rear axle of the wheelchair 10, while also selectively electrically connects to a motorized drive attached to the wheelchair 10. When not attached to the wheelchair 10, the steering assembly 100 can be collapsed (or folded) to reduce its size. This in turn reduces a footprint of the steering assembly 100 to facilitate transport (e.g., in a car, a van, a motor vehicle, etc.) and/or storage. The steering assembly 100 also includes an alignment system 500 such that in response to a user not applying a steering force (or guiding force or rotational force) to the steering assembly 100, the steering assembly 100 will self-align.

Figure 1:
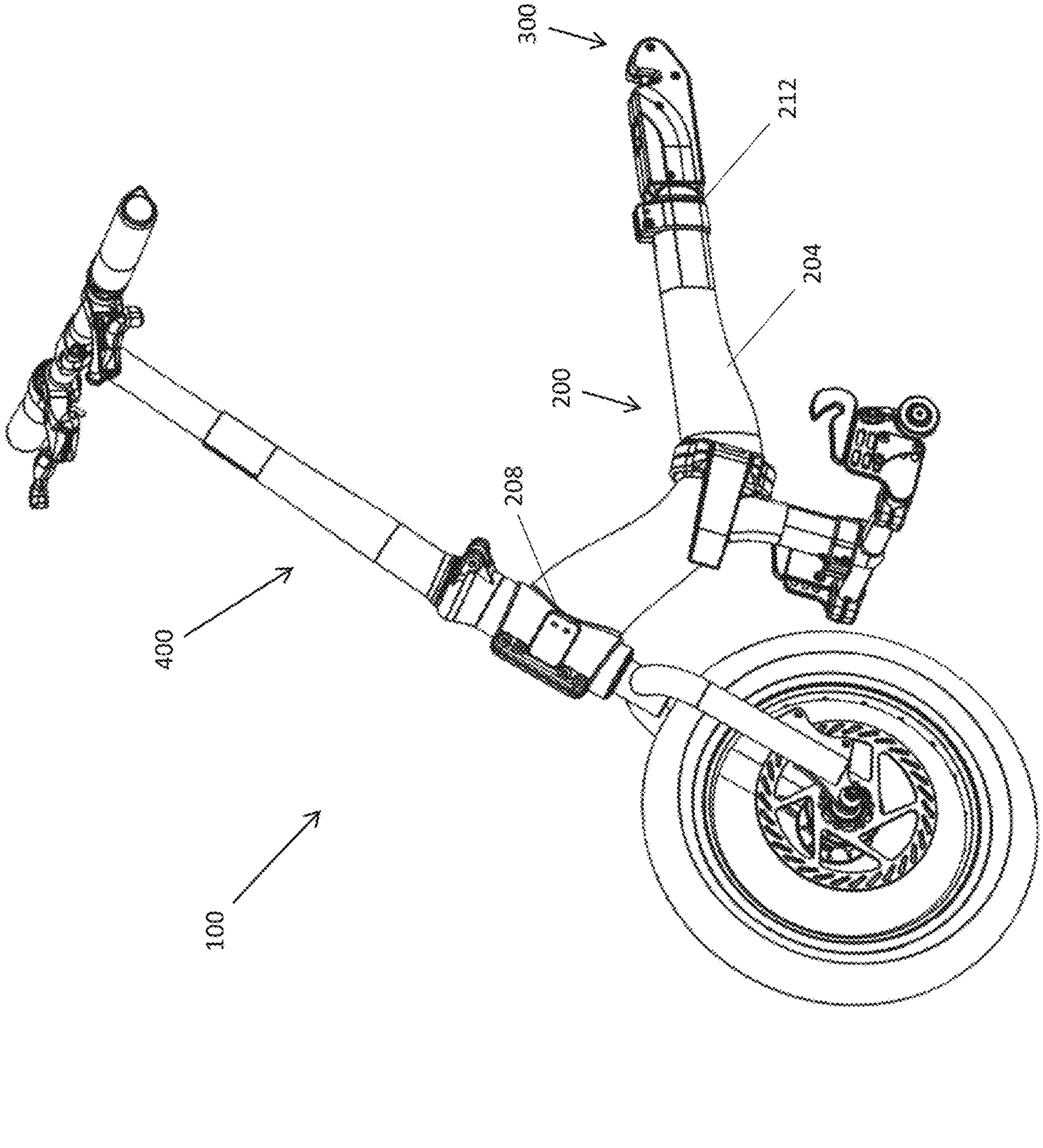
FIG. 1 is a perspective view of a steering assembly that is configured for selective attachment to a wheelchair.

With reference now to the figures, FIG. 1 illustrates an embodiment of a steering assembly 100. The steering assembly 100 (also referred to as a steering system 100 or a front add-on 100) includes a frame assembly 200, a mounting assembly 300, and a steering device 400. The frame assembly 200 includes an elongated frame member 204. The frame member 204 includes a first end 208 opposite a second end 212. The first end 208 is coupled to the steering device 400. The second end 212 is coupled to the mounting assembly 300. The frame member 204 is substantially hollow from the first end 208 to the second end 212. It should be appreciated that the first and second ends 208, 212 of the frame member 204 are provided to generally describe positions of the respective mounting assembly 300 and steering device 400 relative to the frame member 204, and are not intended to be limiting. For example, the first end 208 of the frame member 204 can alternatively be referred to as a second end, while the second end 212 of the frame member 204 can alternatively be referred to as a first end.

Figure 2:
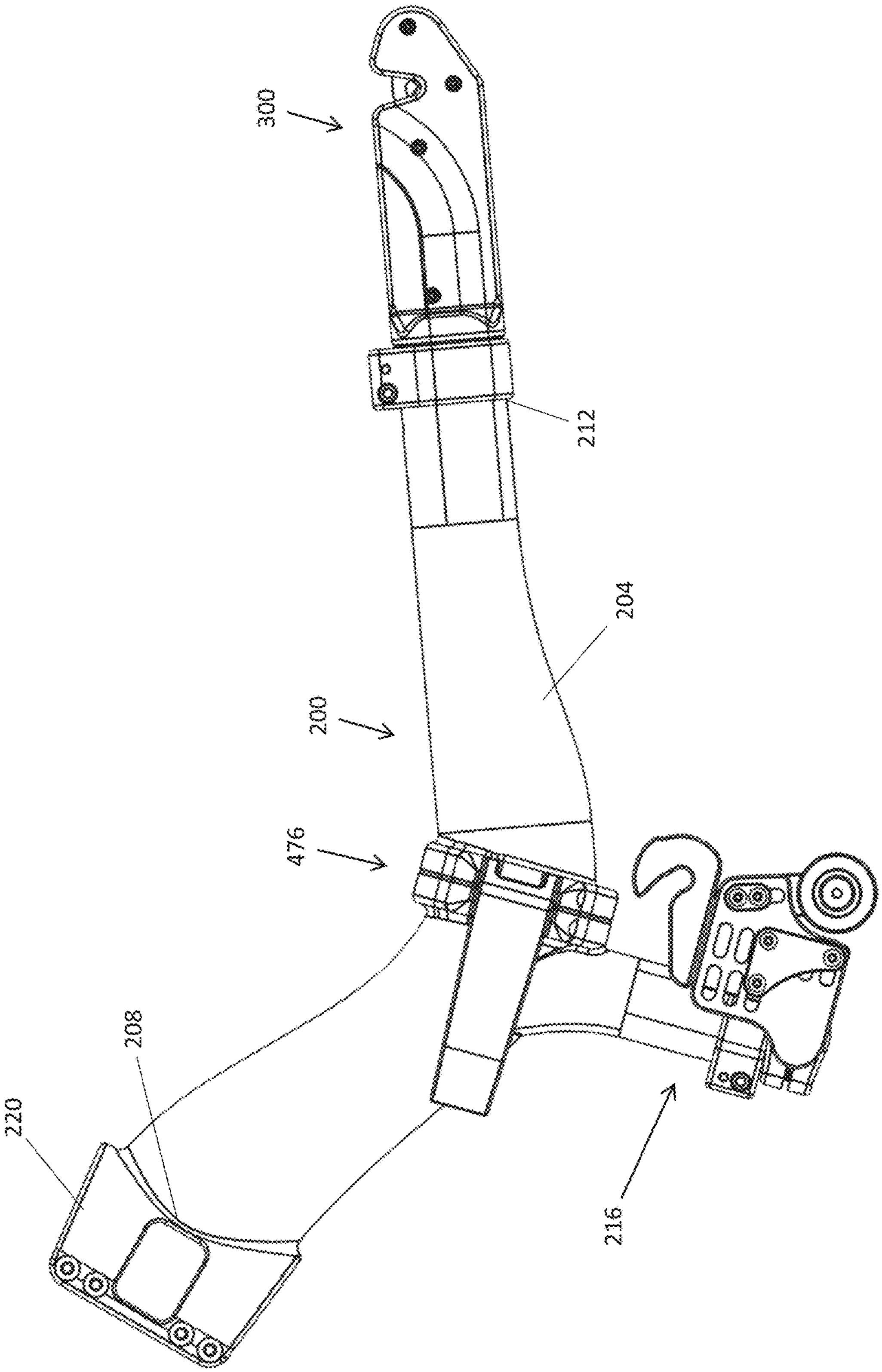
FIG. 2 is a side view of the steering assembly of FIG. 1, with the steering device removed.

With reference to FIG. 2, the mounting assembly 300 slidably engages the second end 212 of the frame member 204. A lift assembly 216 is coupled to the frame member 204. The lift assembly 216 is also configured to selectively engage a portion of the wheelchair 10 (shown in FIG. 15). In addition, the lift assembly 216 provides the user adjustability in at least two directions to facilitate a customized user footrest on the steering assembly 100. A mounting assembly 220 is positioned at the first end 208 of the frame member 204. The mounting assembly 220 (also referred to as a compression arm 220 or a compression assembly 220) is coupled to the frame member 204 and configured to engage and retain the steering device 400. Thus, the steering device 400 is coupled to the first end 208 of the frame member 204. The steering device 400 can also be referred to as a steering assembly 400 or a steering column 400.

Figure 3:
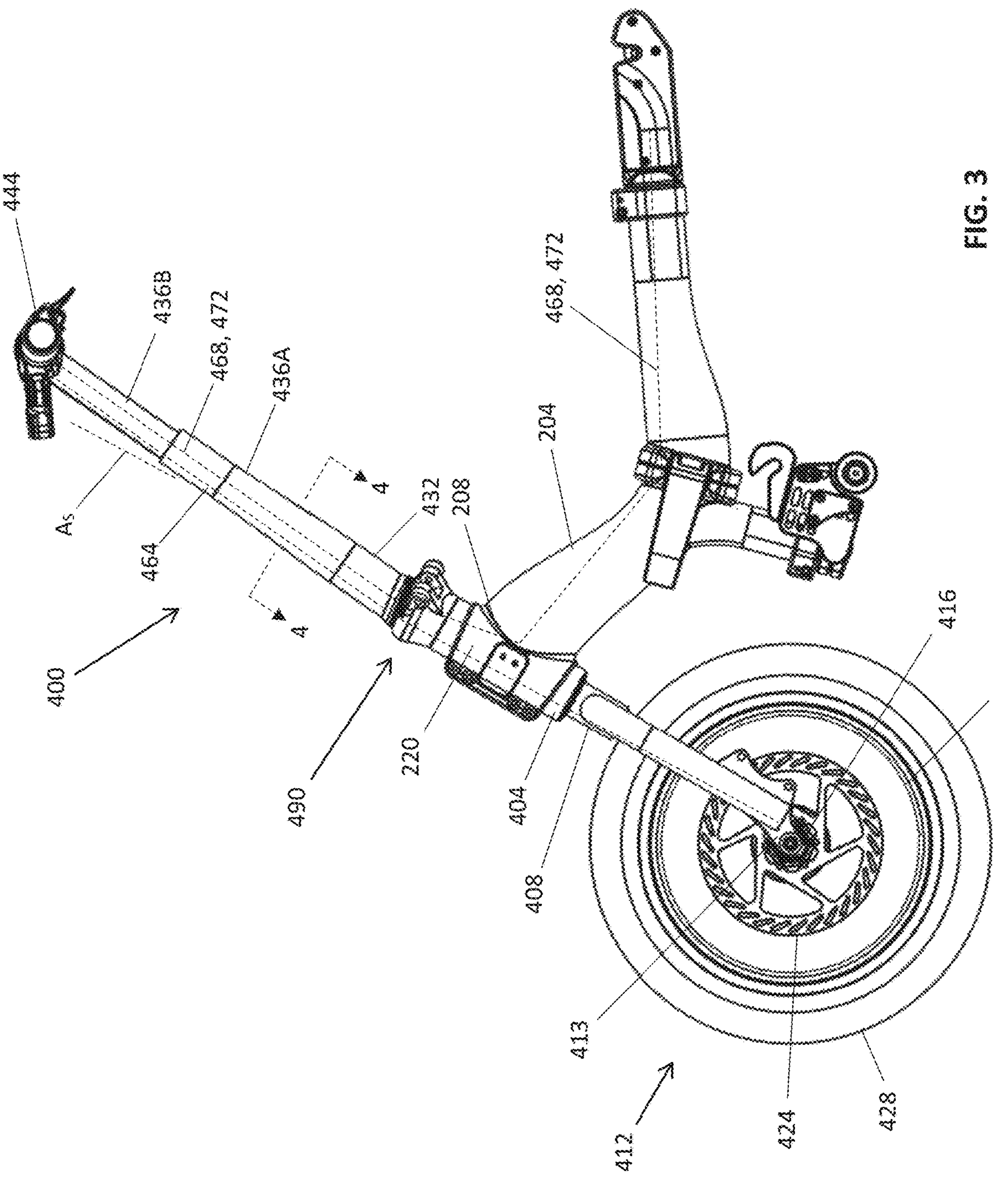
FIG. 3 is a side view of the steering assembly of FIG. 1.
Figure 13:
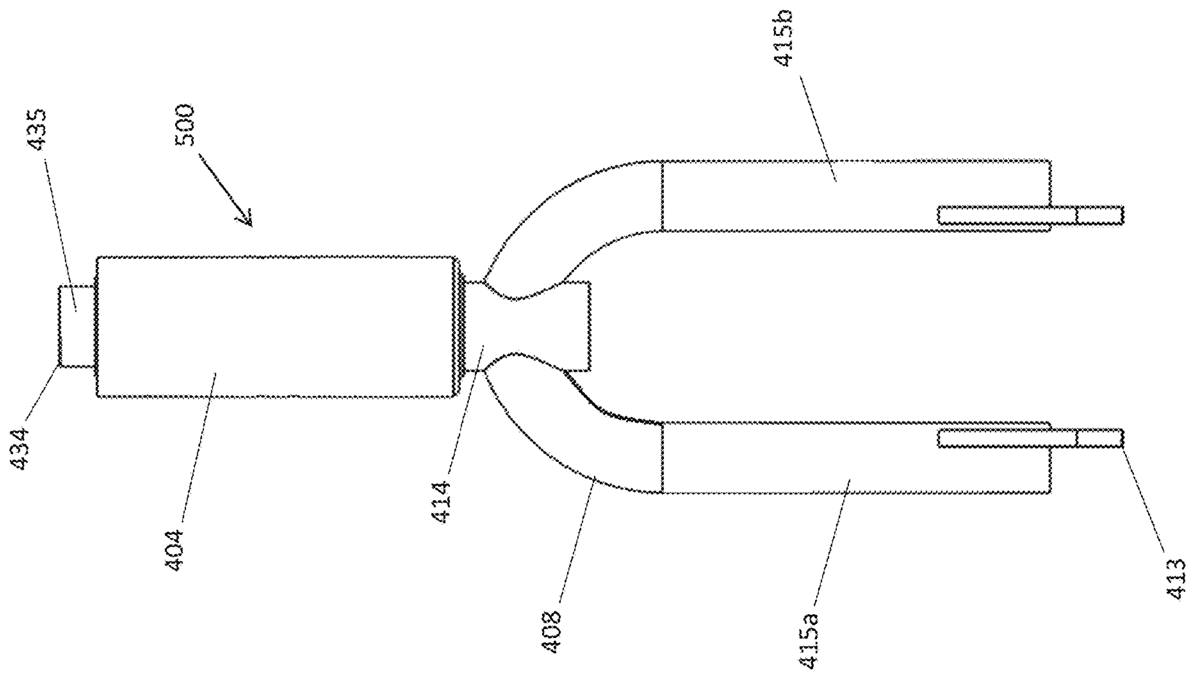
FIG. 13 is a front view of a head tube and a fork detached from the steering device of the steering assembly of FIG. 1 with the front wheel assembly removed for clarity.

With reference now to FIG. 3, the steering device 400 includes a head tube 404 (also referred to as a steering tube 404 or a tube member 404). The head tube 404 is received, and retained, by the mounting assembly 220. The head tube 404 is configured to be nonrotatable relative to the frame member 204. The head tube 404 receives a fork 408. The fork 408 (also referred to as a fork assembly 408) extends completely through the head tube 404 and is configured to rotate relative to the head tube 404. A front wheel assembly 412 is mounted to a first end 413 of the fork 408. As shown in FIG. 13, the fork 408 includes a crown 414 and two opposing blades 415*a*, 415*b*. The blades 415*a*, 415*b* extend from the crown 414, and the front wheel assembly 412 is attached to the opposing blades 415*a*, 415*b*. Referring back to FIG. 3, the front wheel assembly 412 includes a wheel hub 416, a rim 420, a brake 424, and a tire 428. The wheel hub 416 (also referred to as a tire hub 416) is coupled to the fork 408. A rim 420 is coupled to the wheel hub 416, for example by a plurality of spokes (not shown). A brake 424 is coupled to the wheel hub 416. In the illustrated embodiment, the brake 424 is a disc brake that includes a caliper (not shown). In other embodiments, the brake 424 can be any suitable type of brake for selectively slowing rotation of the front wheel hub 416 (and associated wheel). The rim 420 carries a tire 428. The illustrated tire 428 includes an outer tread (not shown) and contains a tube (not shown) for inflation of the tire 428. In other embodiments, the tire 428 can be tubeless, can be foam filled (a run-flat design), or can include any suitable or desired components to facilitate operation.

Figure 4:
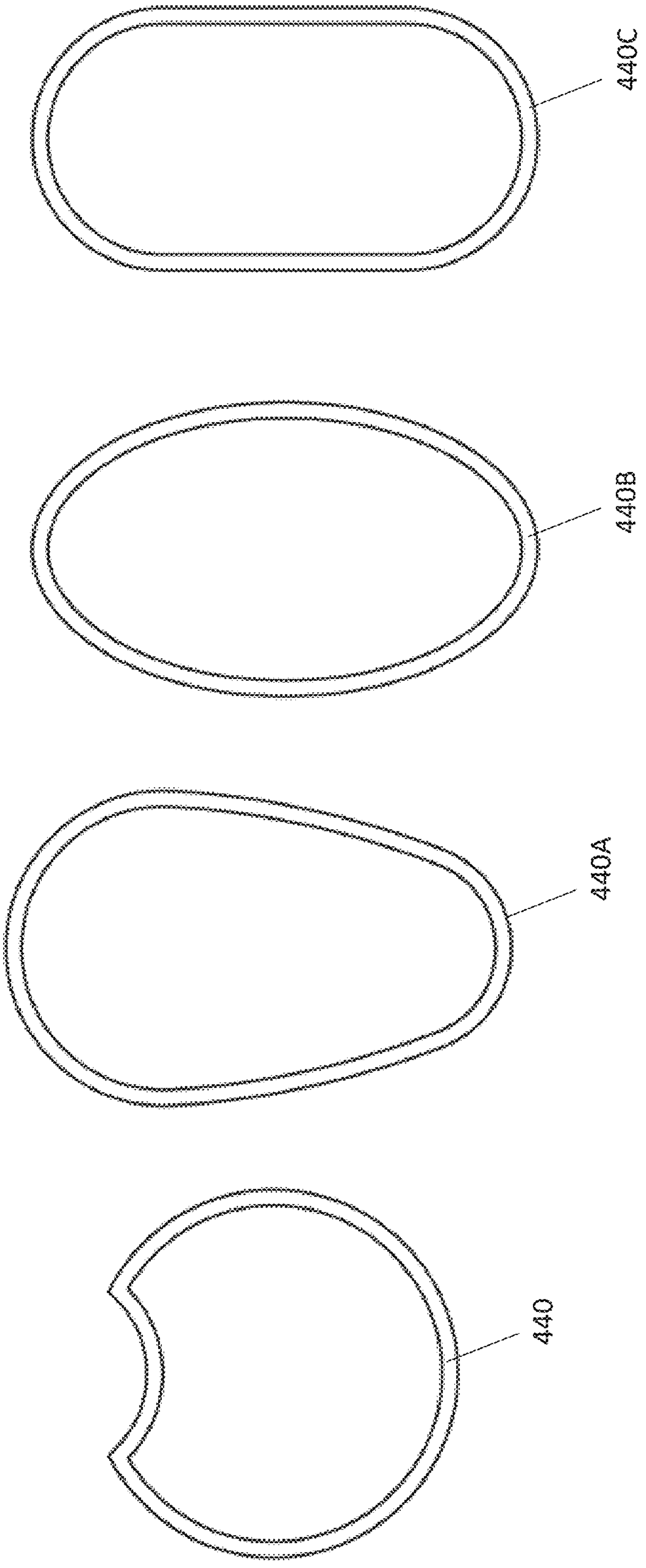
FIG. 4 is a cross-sectional view of the steering stem taken along line 4-4 of FIG. 3, illustrating a cross-sectional geometry and alternative geometries.

A stem 432 is coupled to the fork 408 at a second end 434 (shown in FIG. 13), opposite the first end 413 (or opposite the front wheel assembly 412). More specifically, the stem 432 is coupled to a steerer tube 435 of the fork 408 (shown in FIG. 13). The steerer tube 435 (also referred to as a steering shaft 435) is a portion of the fork 408 that extends from the crown 414 through the head tube 404 (shown in FIG. 13). The stem 432 is coupled to a handlebar 444 at an end opposite the connection to the fork 408. The stem 432 (also referred to as a steering stem 432 or a steering shaft 432) is defined by a plurality of tubular members 436. The plurality of tubular members 426 can include a first tubular member 436A and a second tubular member 436B. In other embodiments, the plurality of tubular members 436 can include three or more members 436. The plurality of tubular members 436 are substantially hollow members. In addition, the plurality of tubular members 436 are configured to telescope, or slide, relative to each other to facilitate height adjustment of the handlebar 444 relative to the head tube 404 (and in turn relative to the wheelchair 10). The height adjustment can be based on a user preference (e.g., user customization, user comfort, user fit, etc.). Each tubular member 436 has a cross sectional shape that facilitates sliding movement of the tubular members 436 relative to each other but restricts rotational movement of the tubular members 436 relative to each other. This allows for sliding adjustment between the members 436 (to adjust a height of the stem 432), while also allowing the members 436 to rotate together in response to rotational movement of the stem 432 by the user through rotation of the steering device 400 (i.e., in response to steering, etc.). With reference to FIG. 4, several examples of different cross-sectional geometries that can be applied to the tubular member 436 are illustrated. A cross-sectional geometry 440 of the illustrated members 436 is generally circular with a crescent recess. However, in other embodiments, the geometry can be adjusted to facilitate sliding of the members 436 relative to each other, while facilitating joint (or collective) rotation of the members 436. For example, in other examples of embodiments, the cross-sectional geometry 440A can be an oval with one axis of symmetry. In yet further examples of embodiments, the cross-sectional geometry 440B can be an ellipse. In additional examples of embodiments, the cross-sectional geometry 440C can be a stadium or discorectangle. It should be appreciated that the cross-section geometry can be any suitable shape that facilitates sliding, telescopic adjustment between the members 436 while also facilitating joint rotation of the members 436. While the illustrated cross-sectional geometries are discussed in association with the tubular member 436, it should be appreciated that one or more of these geometries can also be incorporated into additional components of the steering assembly 100 to facilitate sliding adjustment of consecutive members while limiting rotation (or joining rotation) of the consecutive members. For example, the second end 212 of the frame member 204 (shown in FIG. 6) has a cross-sectional geometry of the oval with one axis of symmetry 440A. This geometry facilitates slidable engagement with the mounting assembly 300, while limiting (or restricting) rotational movement between the mounting assembly 300 and the frame member 204. In other embodiments, the frame member 204 and/or the second end 212 of the frame member 204 can have any geometry shown in FIG. 4, or any suitable geometry that facilitates sliding movement of the attached components, while limiting (or restricting) rotational movement between the attached components.

Figure 5:
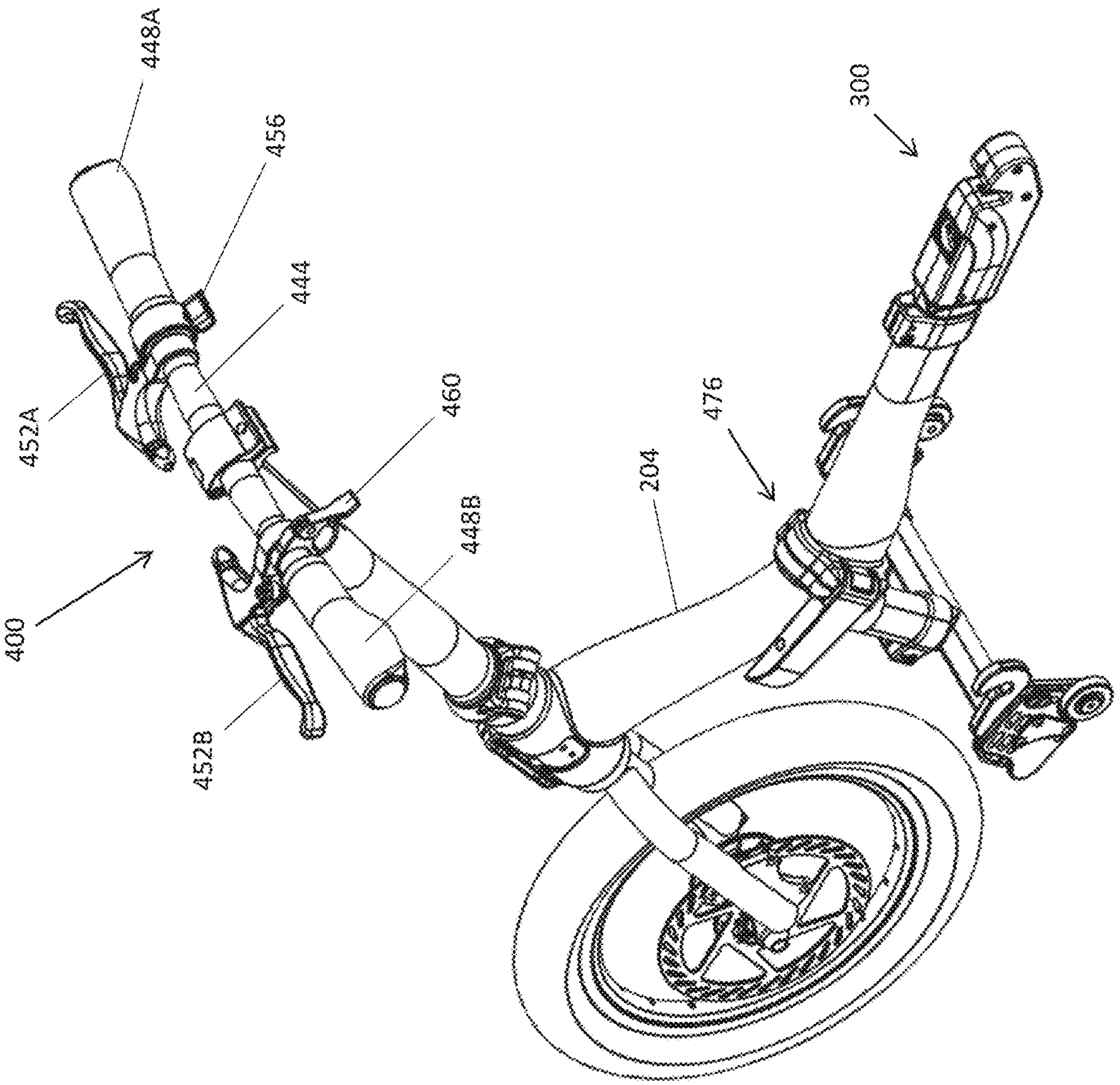
FIG. 5 is a perspective view of the steering assembly of FIG. 1, illustrating the handlebars of the steering device.

Referring now to FIG. 5, the handlebar 444 includes a plurality of handgrips 448A, B. The handgrips 448A, B provide a user a contact point to grasp and operate the handlebar 444. The handlebar 444 includes a plurality of brake actuators 452A, B (also referred to as brake levers 452A, B). Each brake actuator 452A, B is positioned relative to a respective handgrip 444A, B to allow the user to actuate one (or both) of the brake actuators 452A, B to initiate braking while continuing to engage the handgrips 448A, B. A throttle 456 is positioned relative to a first handgrip 448A, while a release actuator 460 (also called a release lever 460) is positioned relative to a second handgrip 448B. The throttle 456 can also be referred to as a first actuator 456, while the release actuator 460 can also be referred to as a second actuator 460. It should be appreciated that while the release actuator 460 is illustrated on the handlebar 444, and more specifically near the second handgrip 448B, this positioning is intended to be nonlimiting. The release actuator 460 can be positioned at any suitable position or location that is accessible by the user. For example, the release actuator 460 can be positioned at any suitable or desired location on the handlebar 444, can be positioned on one of the members 436 (see FIG. 3), can be positioned on the frame member 204, etc.

With reference back to FIG. 3, the head tube 404 defines a steering axis $A_s$. The steering axis $A_s$ is the axis about which the steering components (e.g., the fork 408, the front wheel assembly 412, the stem 432, the handlebar 444, etc.) rotate. More specifically, the handlebar 444 is configured to be engaged by the user (through one or both handgrips 448A, B). As the user rotates the handlebar 444, the stem 432 responsively rotates, which in turn rotates the fork 408 and the front wheel assembly 412. The fork 408 rotates relative to the head tube 404, which remains stationary and coupled to the frame assembly 200 by the frame member 204. It should be appreciated that the stem 432 can be positioned at an angle to the steering axis $A_s$. The steering axis $A_s$ is defined by the head tube 404. The steering axis $A_s$ can be any suitable angle preferred by a user. For example, the angle can be between approximately zero degrees (0°) and approximately forty-five degrees (45°), and more specifically between approximately zero degrees (0°) and approximately thirty degrees (30°), and more specifically approximately zero degrees (0°) and approximately twenty degrees (20°), and more specifically approximately zero degrees (0°) and approximately fifteen degrees (15°), and more specifically approximately zero degrees (0°) and approximately twelve degrees (12°). Accordingly, the stem 432 can be positioned along the steering axis $A_s$, or can be angled from the steering axis $A_s$, for example up to approximately forty-five degrees (45°), and more specifically up to approximately thirty degrees (30°), and more specifically up to approximately twenty degrees (20°), and more specifically up to approximately fifteen degrees (15°), and more specifically up to approximately twelve degrees (12°), and more specifically less than approximately twelve degrees (12°).

One or both of the brake actuators 452A, B are in operable communication with the brake 424. For example, a brake cable 464 (shown in broken lines) can extend from the brake actuators 452A, B, through the hollow stem 432, to the brake 424. This allows actuation of the brake actuator(s) 452A, B to initiate operation of the brake 424 (e.g., engage the caliper with the disc, etc.). The throttle 456 and the release actuator 460 are each in operable communication with the mounting assembly 300. For example, a throttle cable 468 (or electrical cable 468) (shown in broken lines) can extend from the throttle 456, through the hollow stem 432, through the frame member 204 (e.g., from the first end 208 to the second end 212) to the mounting assembly 300. As another example, a release cable 472 (shown in broken lines) can extend from the release actuator 460, through the hollow stem 432, through the frame member 204 (e.g., from the first end 208 to the second end 212) to the mounting assembly 300. It should be appreciated that the throttle cable 468 and the release cable 472 are shown as a single broken line for purposes of clarity. The cables 468, 472 can be separate, individual cables positioned adjacent each other (or connected to each other). In other embodiments, the throttle 456 and/or the release actuator 460 can be in communication with the mounting assembly 300 wirelessly (e.g., Bluetooth, etc.) or through any suitable communication system to respectively provide throttle adjustment or release of the mounting assembly 300 in response to actuation of the respective throttle 456 or release actuator 460.

Figure 6:
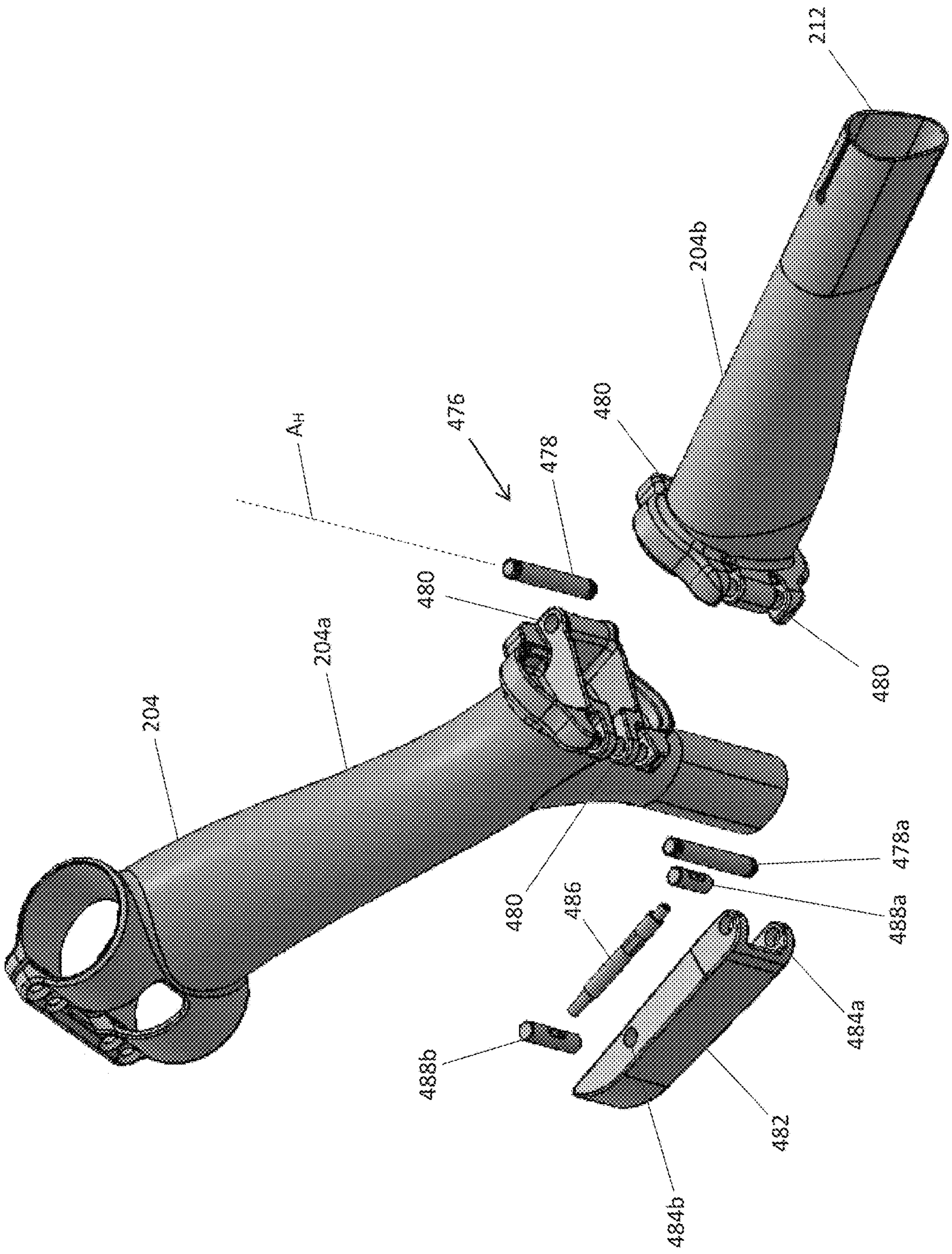
FIG. 6 is a perspective, partially exploded view of a portion of the steering assembly of FIG. 1, with the steering device, mounting assembly, and lift assembly removed to illustrate the frame member and associated first hinge assembly.

The steering assembly 100 includes a plurality of hinge assemblies to facilitate collapsibility of the steering assembly 100. With reference to FIG. 2, a first hinge assembly 476 is positioned in the frame assembly 200. More specifically, the first hinge assembly 476 is positioned in the frame member 204 between the first end 208 and the second end 212. With reference to FIG. 6, the first hinge assembly 476 is illustrated in a partially exploded view. The frame member 204 is illustrated with a first frame member 204*a* (also referred to as a front frame member 204*a*) and a second frame member 204*b* (also referred to as a rear frame member 204*b*). The first hinge assembly 476 connects the first and second frame members 204*a, b*. A hinge pin 478 is positioned on one side (or a first side) of the frame member 204. The hinge pin 478 is received in aligned apertures 480 of the first and second frame members 204*a, b*. The hinge pin 478 defines a hinge axis $A_H$. The first and second frame members 204*a, b* are configured to hinge relative to each other about the hinge axis $A_H$. A hinge latch handle 482 is coupled to an opposite side (or a second side) of the frame member 204. The hinge latch handle 482 includes a pair of opposing apertures 484*a*, 484*b*. The pairs of apertures 484*a*, 484*b* are spaced from each other along the hinge latch handle 482. A set of first apertures 484*a* is configured to align with apertures 480 on the second side of the second frame member 204*b*. The aligned apertures 484*a*, 480 receive a hinge pin 478*a*, pivotably coupling the hinge latch handle 482 to the frame member 204, and more specifically the second frame member 204*b*. The hinge latch handle 482 is also configured to pivotably connect to the first frame member 204*a*. More specifically, the hinge latch handle 482 is configured to pivotably connect to the first frame member 204*a* by a connecting rod 486. A first latch pin 488*a* is received by a set of second apertures 484*b* in the hinge latch handle 482, coupling one end of the connecting rod 486 to the hinge latch handle 482. A second latch pin 488*b* is received by apertures 480 on the second side of the first frame member 204*a*, coupling as second, opposite end of the connecting rod 486 to the first frame member 204*a*. The latch pins 488*a, b* are thus positioned on opposing ends of the connecting rod 486. It should be appreciated that the hinge pin 478 and the hinge latch handle 482 are interchangeable such that they can be connected on either side of the frame member 204. While FIG. 6 illustrates the hinge pin 478 on the first side of the frame member 204, and the hinge latch handle 482 on the second side of the frame member 204, in other examples of embodiments, the hinge pin 478 can be positioned on the second side of the frame member 204, and the hinge latch handle 482 on the first side of the frame member 204.

Figure 7:
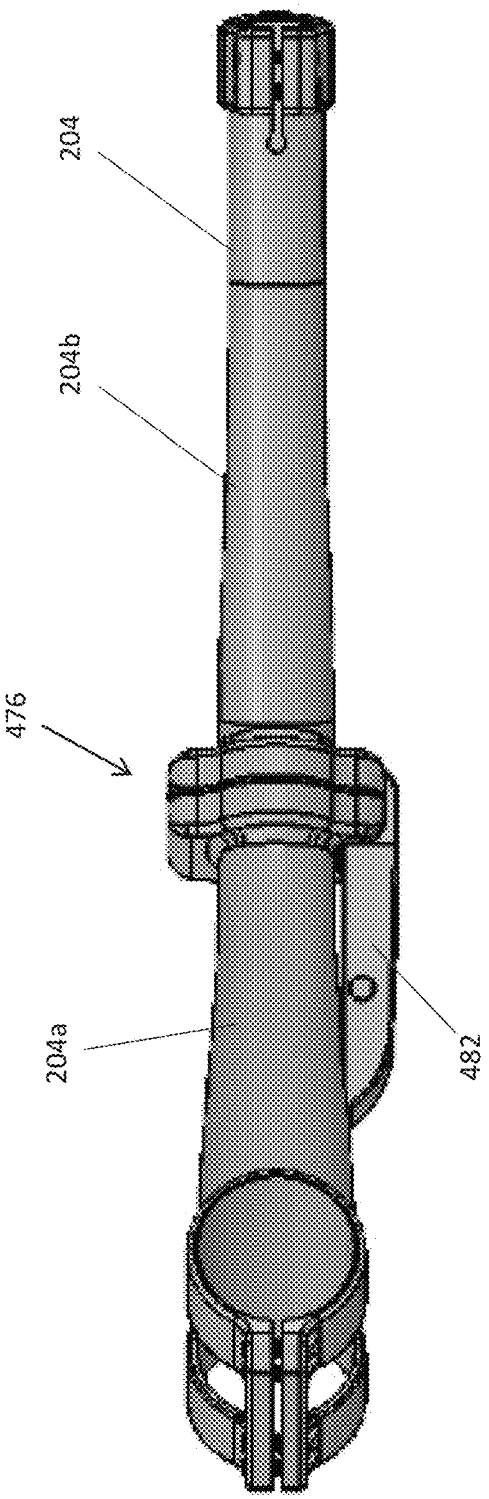
FIG. 7 is a top down view of the portion of the frame member and associated first hinge assembly of FIG. 6, shown in a first, unhinged configuration.
Figure 8:
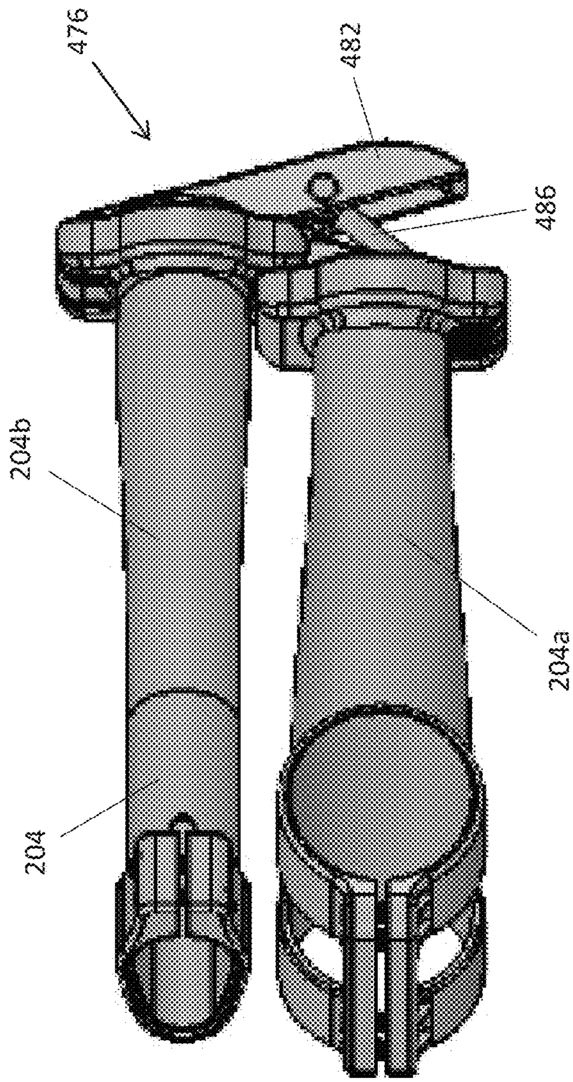
FIG. 8 is a top down view of the portion of the frame member and associated first hinge assembly of FIG. 6, shown in a second, hinged configuration.

The first hinge assembly 476 is configured to be actuated between a first, unhinged configuration (or a closed position of the first hinge assembly 476) and a second, hinged configuration (or an open position of the first hinge assembly 476). The hinge latch handle 482 is advantageously provided to shield (or protect) the cables 468, 472 in response to the frame members 204*a*, 204*b* being oriented in the second, hinged configuration. FIG. 7 illustrates the frame member 204 in the first, unhinged configuration. In this configuration, the first and second frame members 204*a*, 204*b* are generally aligned. Thus, the frame member 204 is in an operational configuration (or an orientation that is configured for operation). The hinge latch handle 482 is positioned along a side of the frame members 204*a*, 204*b*. FIG. 8 illustrates the frame member 204 in the second, hinged configuration. In this configuration, the frame member 204 is hinged (or collapsed or a collapsed configuration), which can be desired for transport and/or storage of the steering assembly 100. More specifically, the frame members 204*a*, 204*b* are positioned in a folded position where the members 204*a, b* are positioned offset from each other (or approximately parallel to each other). The hinge latch handle 482 extends between the members 204*a, b* in order to shield (or protect) the cables 468, 472 (shown in FIG. 3) that extend through the interior of the frame member 204.

To transition from the first, unhinged configuration (FIG. 7) to the second, hinged configuration (FIG. 8), a user can actuate the hinge latch handle 482 away from the frame member 204 (and specifically the first frame member 204*a*. The hinge latch handle 482 can then rotate relative to the second frame member 204*b* about the hinge pin 478*a*. As the hinge latch handle 482 is rotated, it remains coupled to the first frame member 204*a* by the connecting rod 486. The second frame member 204*b* is now free to pivot (or rotate) relative to the first frame member 204*a* about the hinge pin 478 (or about the hinge axis $A_H$). Stated another way, the first frame member 204*a* is also free to pivot (or rotate) relative to the second frame member 204*b* about the hinge pin 478 (or about the hinge axis $A_H$). As the frame members 204*a*, 204*b* pivot (or rotate) relative to each other from an aligned position to a folded position, where the members 204*a, b* are positioned offset from each other (or approximately parallel to each other), the hinge latch handle 482 shields (or protects) the cables 468, 472 that extend through the interior of the frame member 204. Thus, the hinge latch handle 482 guides the cables 468, 472 to continue to extend through the interior of the frame member 204 in the second, folded configuration, while also shielding the cables 468, 472 from potential damage due to being accessible (or exposed) when the frame member 204 is in the second, folded configuration.

To transition from the second, hinged configuration (FIG. 8) to the first, unhinged configuration (FIG. 7), the user can pivot (or rotate) the frame members 204*a*, 204*b* relative to each other about the hinge pin 478 (or about the hinge axis $A_H$) from the folded position (FIG. 8) to the aligned position (FIG. 7). The hinge latch handle 482 shields (or protects) the cables 468, 472 that extend through the interior of the frame member 204 during unfolding of the frame members 204*a*, 204*b*. Once the frame members 204*a*, 204*b* are generally aligned, the hinge latch handle 482 can than rotate relative to the second frame member 204*b* about the hinge pin 478*a* towards the first frame member 204*a* to lock the members 204*a, b* in the aligned orientation.

Figure 9:
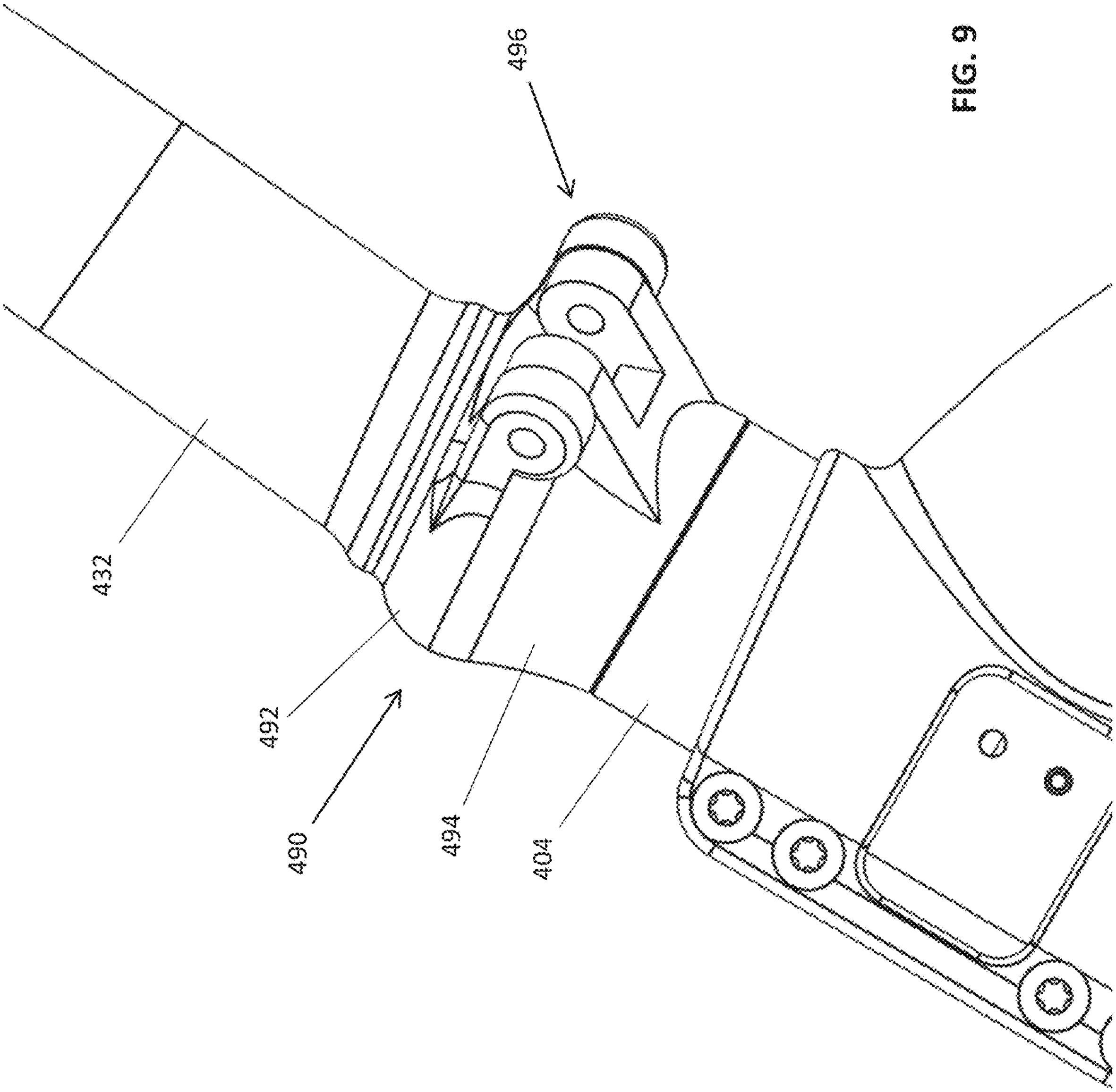
FIG. 9 is a close-up view of a portion of the steering assembly of FIG. 3 illustrating a second hinge assembly positioned in the steering device.

With reference back to FIG. 3, a second hinge assembly 490 is positioned in the steering device 400 between the handlebar 444 (or the steering device 444) and the front wheel assembly 412 (or a front wheel 412). More specifically, and with reference to FIG. 9, the second hinge assembly 490 is positioned between the head tube 404 and the stem 432. The second hinge assembly 490 includes a first hinge member 492 coupled to the stem 432, and a second hinge member 494 coupled to the fork 408 (shown in FIG. 3). The second hinge member 494 can thus rotate with the fork 408 relative to the stationary head tube 404 in response to rotational movement of the stem 432 by the user through rotation of the handlebar 444 (i.e., in response to steering, etc.) (shown in FIG. 3). The first and second hinge members 492, 494 are connected by a hinge 496. The hinge members 492, 494 are configured to hinge relative to each other around the hinge 496. In FIG. 9, the second hinge assembly 490 is illustrated in a closed position (or an extended configuration). In this position, the stem 432 (and the steering device 400) is in an operational configuration. More specifically, the stem 432 is in alignment (or operational alignment) with the fork 408 (or the head tube 404), as shown in FIG. 3.

Figure 10:
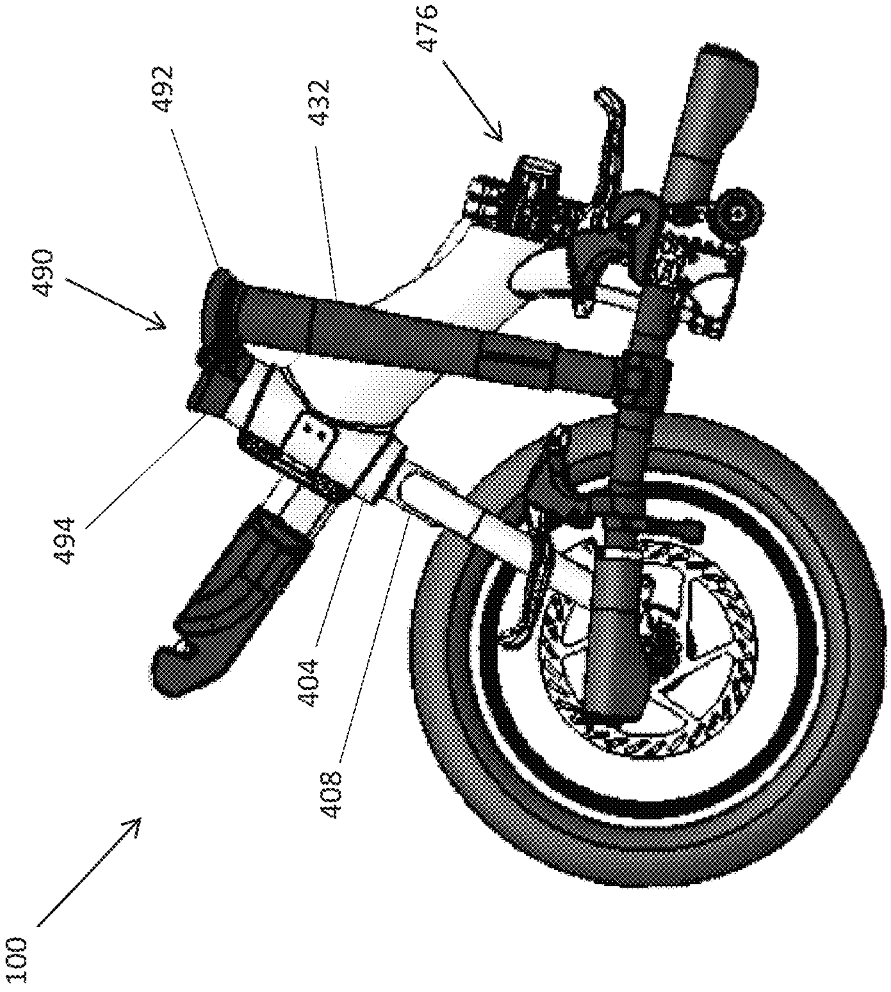
FIG. 10 is a side view of the steering assembly of FIG. 1 in a collapsed configuration.
Figure 12:
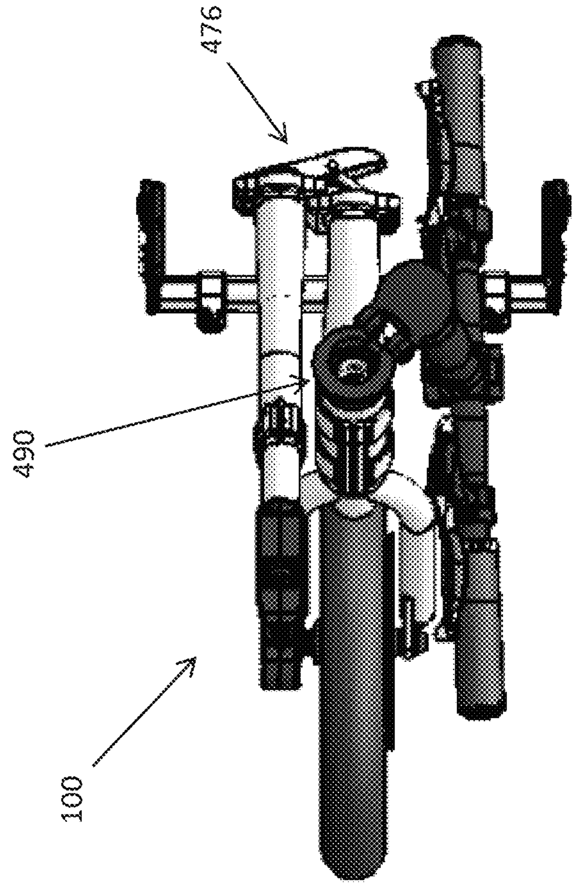
FIG. 12 is a top down view of the steering assembly of FIG. 10.
Figure 11:
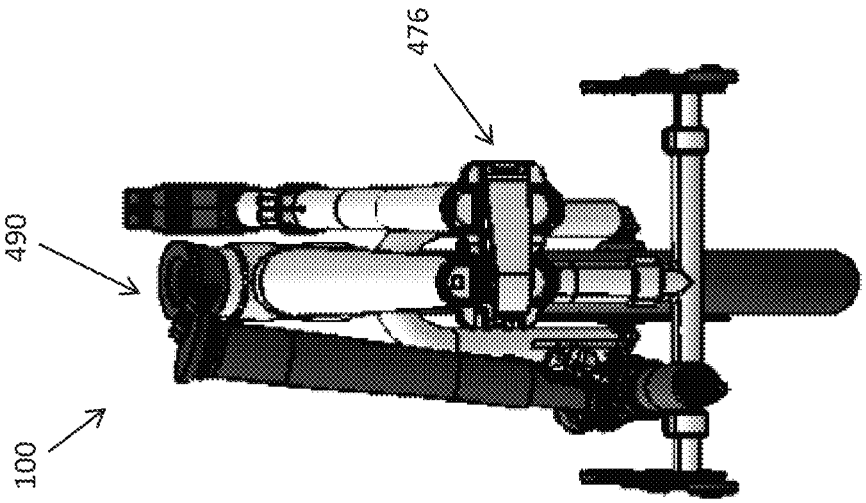
FIG. 11 is a rear view of the steering assembly of FIG. 10.

With reference now to FIG. 10, the second hinge assembly 490 is illustrated in an open position (or a collapsed configuration). In this position, the stem 432 (and the steering device 400) is illustrated in the collapsed configuration which can be desired for transport and/or storage of the steering assembly 100. In the open position, the first hinge member 492 has pivoted around the hinge 496 (shown in FIG. 9) relative to the second hinge member 494 such that the stem 432 is not in alignment (or not in operational alignment) with the fork 408 (or the head tube 404). FIGS. 10-12 also illustrate the first hinge assembly 476 in the second, hinged configuration. With both hinge assemblies 476, 490 in a collapsed configuration, the steering assembly 100 is in a collapsed configuration optimized for transport and/or storage when not in use (or not attached to the wheelchair 10).

It should be appreciated that the first hinge assembly 476 and the second hinge assembly 490 are used in the detailed description for purposes of clarity. The second hinge assembly 490 can also be referred to as a first hinge assembly. Similarly, the first hinge assembly 476 can be referred to as a second hinge assembly. In addition, in other examples of embodiments, the steering assembly 100 can only include one hinge assembly (either hinge assembly 476 or hinge assembly 490). In these embodiments, either hinge assembly 476, 490 can be referred to as a first hinge assembly.

Figure 14:
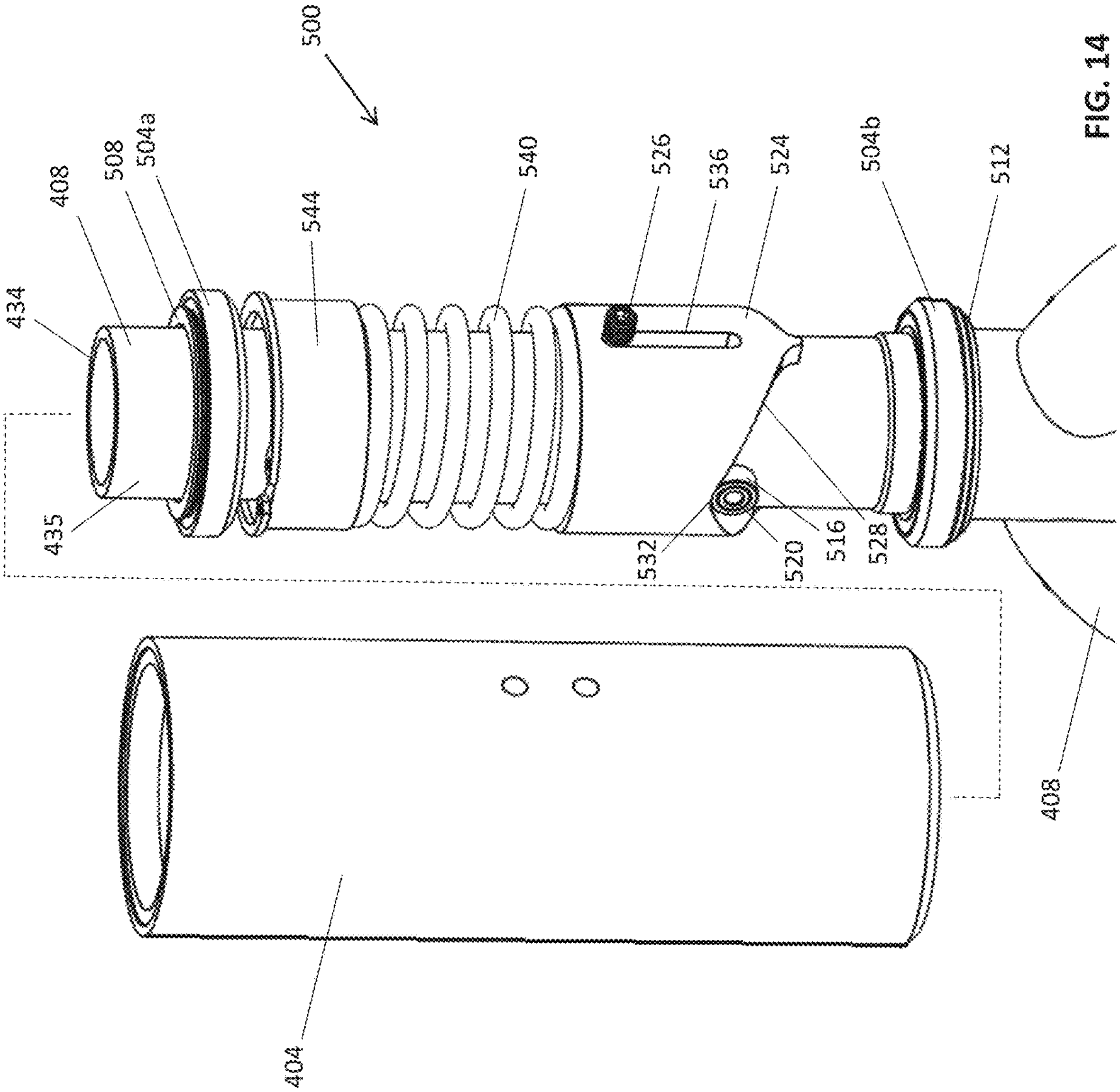
FIG. 14 is a perspective view of the head tube and fork of FIG. 13, with the head tube removed to illustrate an alignment assembly.

With reference now to FIGS. 13-14, the steering device 400 includes an alignment assembly 500 (also referred to as an alignment system 500). The alignment assembly 500 is positioned within the head tube 404 and coupled to a portion of the fork 408 (or fork assembly 408). The alignment assembly 500 is configured to facilitate rotation of the fork 408 in response to a steering force applied by a user to the steering assembly 400 (and more specifically to the steering stem 432 by the handlebars 444, shown in FIG. 3). In addition, the alignment assembly 500 is configured to align the fork 408 relative to the head tube 404, which in turn aligns the front wheel assembly 412 (and the associated from wheel 428) coupled to the fork 408, when the steering force is not applied by the user to the steering assembly 400. As such, the alignment system 500 is configured to self-align the fork 408 and associated front wheel assembly 412.

As illustrated in FIG. 14, the alignment assembly 500 includes a pair of bearing cartridges 504*a*, 504*b*. The bearing cartridges 504*a*, 504*b* are coupled to the fork 408 (or the steerer tube 435) and are configured to engage the head tube 404. The bearing cartridges 504*a*, 504*b* facilitate rotational movement of the fork 408 relative to the head tube 404, for example in response to the steering force applied by the user. A first bearing cartridge 504*a* receives a portion of the fork 408 and is restricted from sliding movement along the portion of the fork 408 by a compression ring 508. A second bearing cartridge 504*b* receives a portion of the fork 408 and is restricted from sliding movement along the portion of the fork 408 by a crown race 512. The bearing cartridges 504*a*, 504*b* can be any suitable type of bearing assembly suitable to facilitate rotational movement of the fork 408 relative to the head tube 404. The bearing cartridges 504*a*, 504*b* are also positioned on opposing ends of the head tube 404.

At least one bearing 516 is mounted to the fork 408 (or the steerer tube 435) by a bearing shaft 520. The bearing shaft 520 is configured to extend through the fork 408 to couple the at least one bearing 516 to the fork 408. A cam 524 is coupled to the head tube 404 by a fastener 526. The cam 524, shown as a barrel cam 524, includes a cam surface 528 (also referred to as a bearing surface 528). The cam 524 slidably receives a portion of the fork 408 (or a portion of the steerer tube 435) such that the bearing 516 is configured to engage the cam surface 528. The cam surface 528 is sloped in shape (or arcuate in shape or V-shaped or U-shaped) and includes a central recess 532 (or a central point 532). The cam surface 528 slopes away from the central recess 532 on both sides of the central recess 532. The recess 532 corresponds to an aligned position of the fork 408 and the attached front wheel assembly 412, for example a straight line (or a straight direction of traverse). It should be appreciated that the cam surface 528 can include any suitable shape to define a suitable restoring force to the fork 408 (or the steerer tube 435) to align the front wheel assembly 412.

The cam 524 also includes an elongated slot 536 within which the fastener 526 is received. The elongated slot 536 can be referred to as a keyway 536, which can be any suitable sliding joint. Thus, the cam 524 is configured to be rotationally restricted relative to the head tube 404 but is configured to slide relative to the head tube 404. Stated another way, the cam 524 is configured to linearly translate relative to the head tube 404 (as defined by a distance of the elongated slot 536), but in nonrotatable relative to the head tube 404. A biasing member 540 is operably connected to the cam 524. The biasing member 540 is configured to apply a biasing force onto the cam 524. The biasing force on the cam 524 is a restoring force that is configured to position (or reposition) the fork 408 (or the steerer tube 435) relative to the cam 524, rotating the front wheel assembly 412 into an aligned position (or an aligned configuration). The biasing member 540 is coupled to the head tube 404 by a spacer member 544 (or spacer 544). The spacer member 544 restricts movement of the biasing member 540 to facilitate generation of a biasing force. The biasing member 540 and the spacer member 544 are positioned in the head tube 404 (or received by the head tube 404). In addition, the biasing member 540 and the spacer member 544 each receive a portion of the fork 408. It should be appreciated that the bearing 516 and the cam 524 shown in FIG. 14 is one side (a front side) of each component. While the alignment assembly 500 can include, and sufficiently operate, with a cam 524 having one cam surface 528 that engages one bearing 516, in other examples of embodiments, the cam 524 can have two cam surfaces 528. The cam 524 can have the cam surface 528 (also referred to as a first cam surface 528) and a second cam surface 528 positioned on a second, opposite side (or a back side) from the first cam surface 528. The second cam surface 528 can engage a second bearing 516 connected to an opposite end of the bearing shaft 520. The recesses 532 of the opposed cam surfaces 528 horizontally align. In effect, the cam surface 528 and bearing 516 are a mirror image on the back side as illustrated in FIG. 14. Thus, in this embodiment, the cam 524 can be referred to as having at least one cam surface 528 or a plurality of cam surfaces 528. In addition, the cam 524 can include a second fastener 526 received in a second slot 536 positioned on an opposite side of the cam 524 as shown in FIG. 14 to provide an improved fastening of the cam 524 to the head tube 404.

In operation, the alignment assembly 500 is in an aligned orientation, such that the bearing 516 is received by the recess 532 of the cam 524, when a user does not apply a steering force to the steering assembly 400 (and more specifically to the steering stem 432 by the handlebars 444, as shown in FIG. 3). The biasing member 540 applies a biasing force (or a restoring force) to the cam 524. The sloped cam surface 528 directs the bearing 516 into the recess 532, which in turn rotates the fork 408 and attached front wheel assembly 412 into an aligned orientation (i.e., the front wheel assembly 412 is oriented such that a direction of traverse is a straight line). Thus, the alignment assembly 500 is self-aligned as the user is not engaged with the steering assembly 400.

As a user applies a steering force to the steering assembly 400, for example rotating the steering stem 432 by moving the handlebars 444, the steering stem 432 rotates the fork 408 (or rotates the steerer tube 435 of the fork 408). As the fork 408 rotates, the bearing 516 exits the recess 532 and travels along the sloped cam surface 528. Since the cam 524, biasing member 540, and the spacer member 544 are coupled (or fastened) to the head tube 404, these components do not rotate with the fork 408 (or are nonrotatable relative to the fork 408). Instead, as the bearing 516 exits the recess 532 and travels along the sloped cam surface 528, the cam 524 slides relative to the head tube 404 and compresses the biasing member 540. Thus, application of the steering force by the user overcomes the restoring force applied by the biasing member 540. In response to application of the steering force, the cam 524 slides along the fork 408 (or along an axis defined by the portion of the fork 408 received by the cam 524) away from the front wheel assembly 412 (or towards the handlebars 444, shown in FIG. 3). As the cam 524 slides (or translates), the fastener 526 travels within the elongated slot 536. The elongated slot 536 limits (or restricts) the maximum sliding distance of the cam 524 (or the maximum travel distance along the portion of the fork 408) by each end contacting the stationary fastener 526.

As the steering force is released by the user, the biasing member 540 reapplies the restoring force onto the cam 524 to direct the bearing 516 towards the recess 532. This responsively rotates the fork 408 and aligns the fork 408 and the front wheel assembly 412. More specifically, the removal of the steering force allows the restoring force applied by the biasing member 540 to the cam 524 to rotate the fork 408. More specifically, the restoring force directs the cam 524 to slide along the fork 408 (or along an axis defined by the portion of the fork 408 received by the cam 524) towards the front wheel assembly 412 (or away from the handlebars 444, shown in FIG. 3). As the cam 524 slides, the sloped cam surface 528 directs the bearing 516 towards the recess 532. In addition, the fastener 526 travels within the elongated slot 536. As the bearing 516 slides along the cam surface 528 towards the recess 532, the fork 408 responsively rotates, which in turn rotates the front wheel assembly 412. Once the bearing 516 is received by the recess 532, the fork 408 and associated front wheel assembly 412 have rotated into the aligned orientation.

Figure 15:
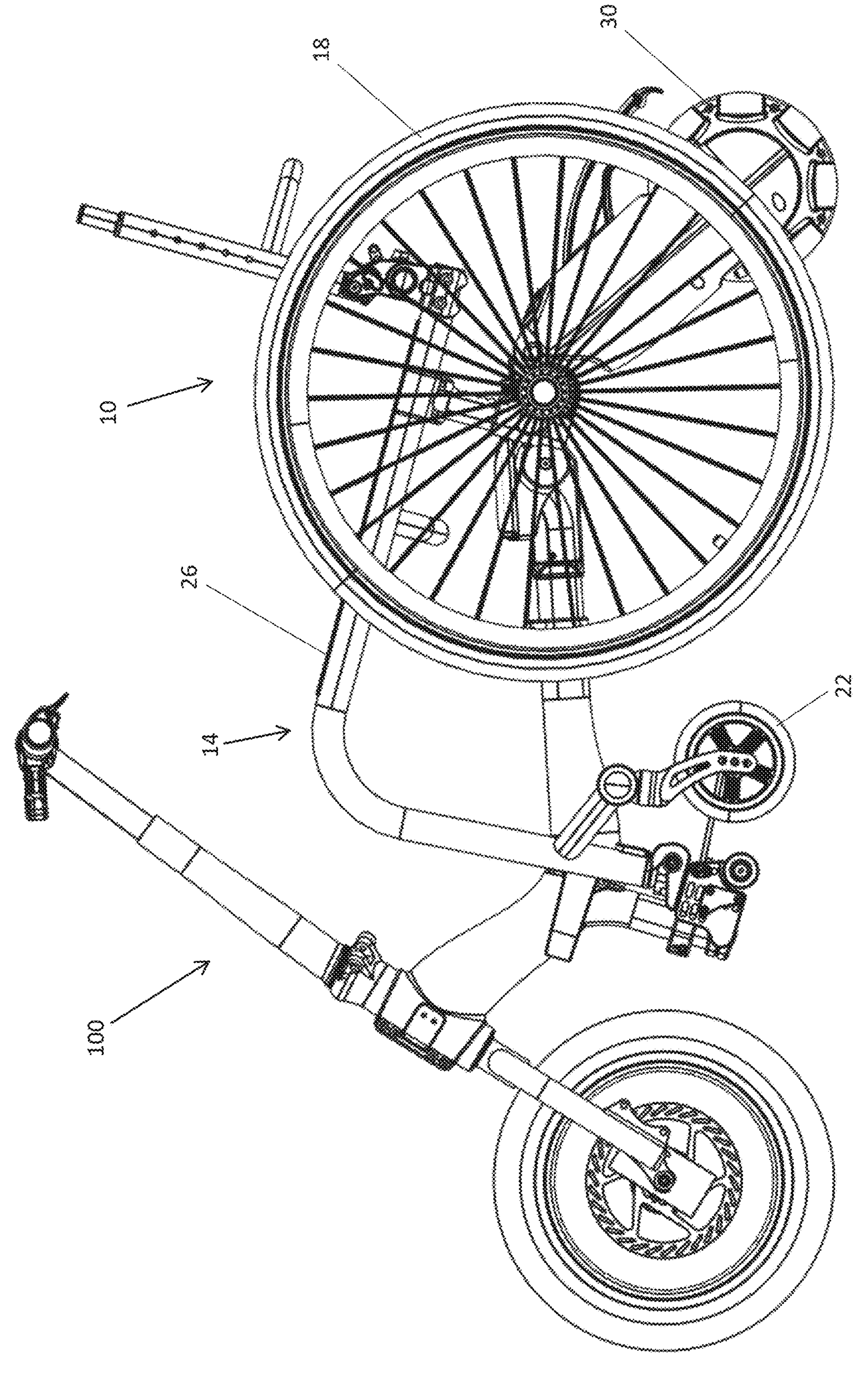
FIG. 15 is a side view of the steering assembly of FIG. 1 attached to a wheelchair.
Figure 16:
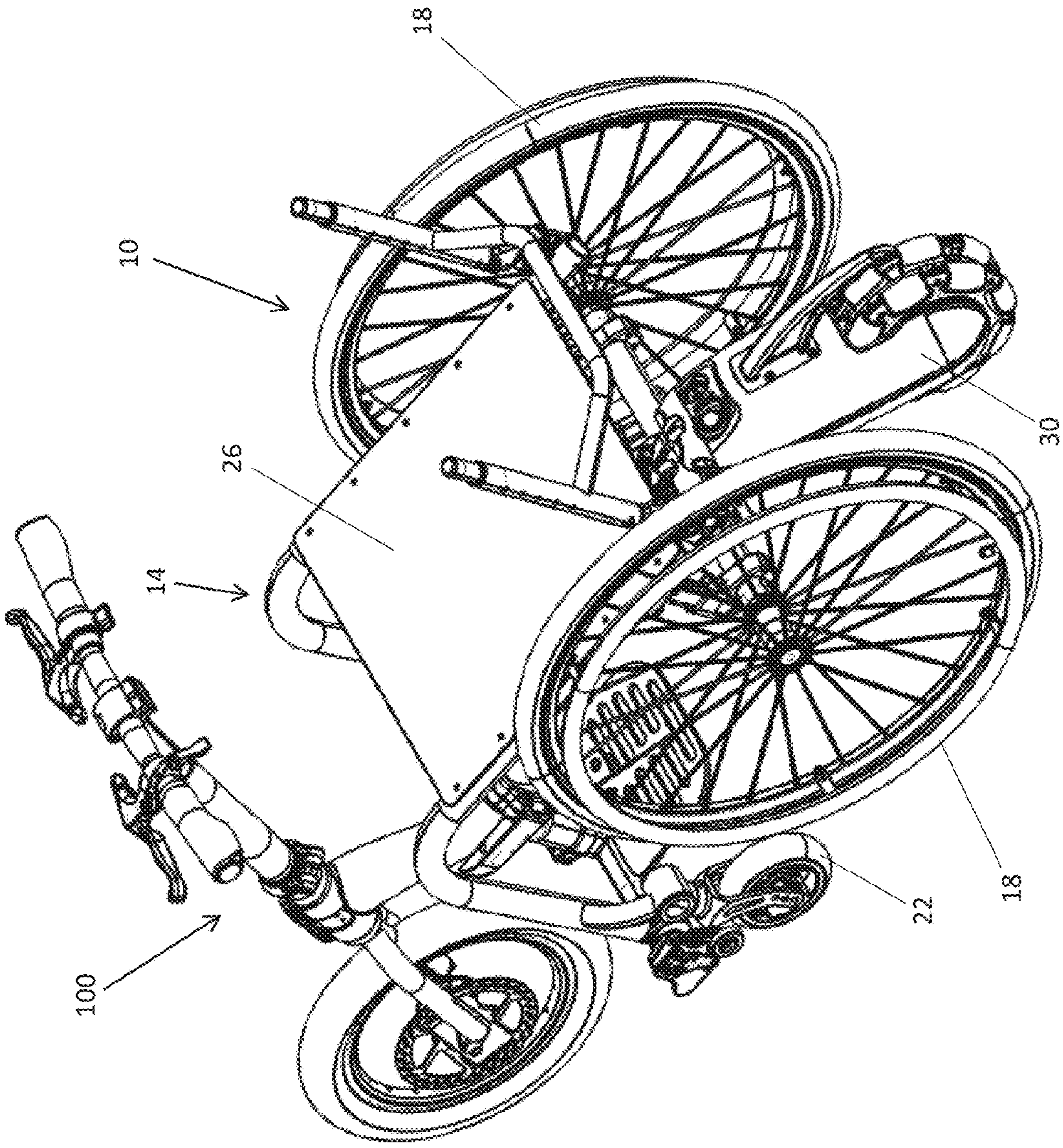
FIG. 16 is a perspective view of the steering assembly attached to the wheelchair of FIG. 15.
Figure 17:
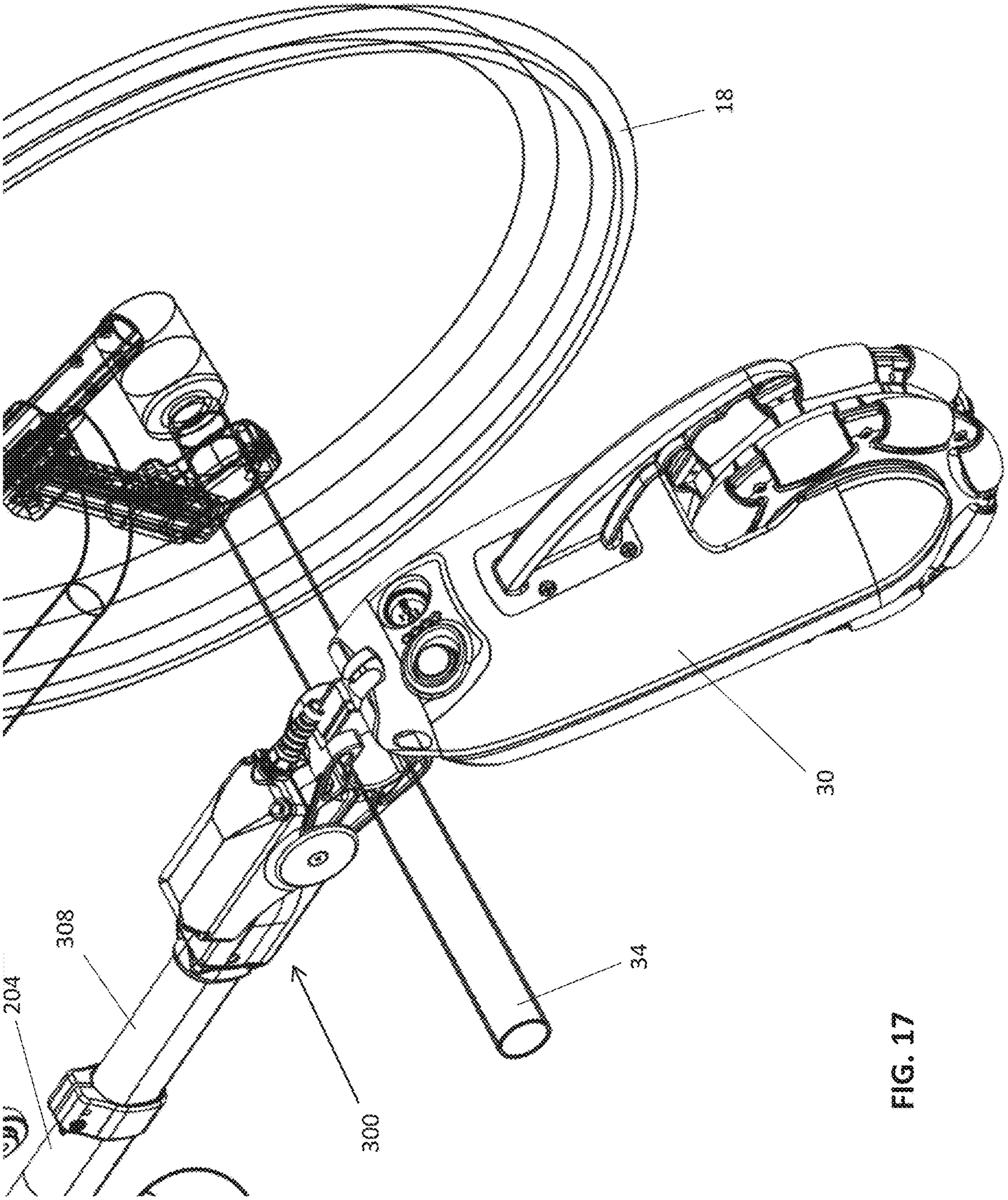
FIG. 17 is a perspective view of a portion of the wheelchair of FIG. 15, with one of the rear wheels and an electrical cable connecting the drive assist to the connection assembly being removed for clarity to illustrate attachment of the steering assembly and the drive assist fastened to the wheelchair.

With reference now to FIGS. 15-17, the steering assembly 100 is shown selectively attached to the wheelchair 10. The wheelchair 10 is illustrated as a manual wheelchair 10. With specific reference to FIGS. 15-16, the wheelchair 10 includes a frame assembly 14. The frame assembly 14 carries a pair of rear wheels 18 and a pair of caster wheels 22. The frame assembly 14 also carries a seat 26. It should be appreciated that FIG. 15 depicts a first side of the wheelchair 10. A second, opposite side (not shown) is a mirror image to the illustrated first side, with the second side having the same components shown on the first side (e.g., a rear wheel 18, a caster wheel 22, etc.). A motorized drive assembly 30 is coupled to the wheelchair 10. More specifically, the motorized drive assembly 30 is coupled to a mounting member 34 fastened to the wheelchair 10. The motorized drive assembly 30 is a motorized drive system that provides motorized drive assistance to propel the wheelchair 10. In the illustrated embodiment, the motorized drive assembly 30 is a drive assist 30 that provides motorized propulsion to the wheelchair 10. The drive assist 30 is positioned rearward of the rear wheels 18, and more specifically rearward of an axis of rotation of the rear wheels 18. The axis of rotation of the rear wheels 18 can be defined by a rear axle of the wheelchair 10. In at least one example of an embodiment, a portion of the drive assist 30 is positioned rearward of the rear axle of the wheelchair 10. In other examples of embodiments, a majority of the drive assist 30 is positioned rearward of the rear axle of the wheelchair 10. Stated another way, the drive assist 30 can be configured to contact the surface upon which the wheelchair 10 is positioned (e.g., ground, flooring, etc.) rearward of the axis of rotation of the rear wheels 18. In addition, the drive assist 30 can be coupled to the wheelchair 10 at a position between the rear wheels 18. For example, the drive assist 30 can be coupled (or mounted or fastened) to a portion of the frame assembly 14 of the wheelchair 10 located between the rear wheels 18. Stated another way, the rear wheels 18 can define an outer boundary, the outer boundary being perpendicular to the rear axle (and perpendicular to the axis of rotation of the rear wheels 18). The drive assist 30 can be coupled (or mounted or fastened) to a portion of the frame assembly 14 of the wheelchair 10 located between (or defined by) the outer boundary. The drive assist 30 is configured to apply a driving force to the wheelchair 10 to drivingly assist with rotation of the rear wheels 18. The illustrated drive assist 30 is a SMARTDRIVE drive assist sold by Max Mobility LLC a division of Permobil AB, which has a corporate headquarters in Timrå, Sweden. It should be appreciated that in other embodiments, the motorized drive assembly 30 can be any suitable drive system that facilitates propulsion of the wheelchair 10. The mounting assembly 34 can include at least one mounting member 34*a* configured to facilitate a connection of the motorized drive assembly 30 to the wheelchair 10. In addition, the mounting member 34*a* can be any suitable member configured to facilitate a connection of the steering assembly 100 to the wheelchair 10. The mounting member 34*a* can be fastened (or coupled) to the wheelchair 10, and more specifically fastened (or coupled) to the frame assembly 14. In the example of embodiment shown in FIGS. 15-17, the mounting member 34*a* is the rear axle of the wheelchair 10. The rear axle 34*a* connects the rear wheels 18 to the frame assembly 14. In other examples of embodiments of the wheelchair 10, the mounting member 34*a* can be a member separate from the rear axle. For example, the mounting member 34*a* can be coupled to the frame assembly 14. The mounting member 34*a* can be positioned on the frame assembly 14 on a side of the seat 26 opposite a side engaged by the user. The mounting member 34*a* can be positioned between the casters 22 and the rear axle or can be positioned on a side of the rear axle opposite the side closest to the casters 22. It should be appreciated that the mounting member 34*a* can be movable relative to the frame assembly 14. For example, in embodiments where the wheelchair 10 is a folding wheelchair, the mounting member 34*a* can be configured to move, pivot, or collapse relative to the frame assembly to facilitate folding (or collapsibility) of the frame assembly 14. It should also be appreciated that the mounting assembly 34 can include at least one member 34*a* or a plurality of members 34*a*. For example, the mounting assembly 34 can include a first mounting member and a second mounting member. In some embodiments, both the first and second mounting members can be fastened (or coupled) to the frame assembly 14. In some embodiments, the first mounting member can be fastened (or coupled) to the frame assembly 14 on a caster 22 side of the rear axle, while the second mounting member can be fastened (or coupled) to the frame assembly 14 on an opposite side of the rear axle. In another example of an embodiment, one of the first or second mounting member can be the rear axle. To this end, the term mounting assembly 34 can include at least one member, and further can include a plurality of members.

With specific reference to FIG. 17, the motorized drive assembly 30 is fastened (or coupled) to the mounting member 34*a*, shown as the rear axle 34*a*. The mounting assembly 300 of the steering assembly 100 is also configured to couple to the mounting member 34*a* of the wheelchair 10. In addition, the mounting assembly 300 is configured to electrically connect to the motorized drive assembly 30. This facilitates a mechanical connection of the steering assembly 100 to the wheelchair 10, and an electrical connection of the steering assembly 100 to the motorized drive assembly 30. The electrical connection includes connecting the motorized drive assembly 30 to the steering device 400 by the throttle cable 468. The mechanical connection includes selectively attaching the steering assembly 100 to the wheelchair 10, which can be selectively detached by the release cable 472.

FIGS. 1-17 depict aspects of a steering assembly 100 that is illustrated as a passive, or non-motorized add on to the wheelchair 10. The steering assembly 100 is configured to cooperate with the motorized drive assembly 30 to provide steering functionality and drive functionality to the associated wheelchair 10. In the illustrated embodiments, the motorized drive assembly 30 effectively provides a rear-wheel drive to the wheelchair 10. However, in other embodiments, the steering assembly 100 can be an active add-on (otherwise referred to as a driven add-on). Stated another way, the steering assembly 100 can incorporate an active drive system that is configured to drive the front wheel assembly 412, along with at least the alignment assembly 500 disclosed herein. In these embodiments, the active steering assembly 100 provides front-wheel drive to the wheelchair 10. The active steering assembly 100 can operate alone, or in combination with the motorized drive assembly 30 to provide both front and rear wheel drive capabilities to the wheelchair 10.

One or more aspects of the steering assembly 100 provides certain advantages. For example, the steering assembly 100 is configured to selectively collapse when not attached to the wheelchair. This reduces a footprint of the steering assembly 100 to facilitate transport (e.g., in a car, a van, a motor vehicle, etc.) and/or storage. To facilitate collapsibility, the steering assembly 100 can include at least one hinge assembly 476, 490. In other examples of embodiments, the steering assembly 100 includes a plurality of hinge assemblies 476, 490. A first hinge assembly 476 can be positioned in the frame assembly 200, while a second hinge assembly 490 can be positioned in the steering device 400. In addition, the steering assembly 100 includes an alignment system 500 such that in response to a user not applying a steering force (or guiding force) to the steering assembly 100, the steering assembly 100 will self-align such that the fork 408 and associated front wheel assembly 412 will rotate into an aligned orientation. These and other advantages are realized by the disclosure provided herein.

What is claimed is:

1. A steering assembly for a wheelchair comprising:
- a frame assembly defining a first end opposite a second end;
- at least one cable extending through the frame assembly;
- a hinge positioned in the frame assembly between the first and second ends, the hinge includes a latch handle; and
- a steering device including a front wheel, the steering device coupled to the first end of the frame assembly,
- wherein the hinge is configured to pivot between a first configuration, where the frame assembly is in an operational configuration, and a second configuration, where the frame assembly is in a collapsed configuration,
- wherein the latch handle is configured to latch the hinge in the first configuration, and
- wherein in response to the frame assembly being in the collapsed configuration, the latch handle is configured to shield the at least one cable.

2. The steering assembly of claim 1, wherein the hinge is a first hinge, and further comprising:
- the steering device including a steering shaft extending from a handlebar to the front wheel; and
- a second hinge positioned in the steering shaft between the handlebar and the front wheel,
- wherein the second hinge is configured to pivot between a closed position, where the steering shaft is in an operational configuration, and an open position, where the steering shaft is in a collapsed configuration.

3. The steering assembly of claim 2, wherein the steering device includes a steering stem coupled to the handlebar, the steering stem is operably connected to the front wheel assembly.

4. The steering assembly of claim 3, wherein the steering stem defines a plurality of tubular members configured to telescope relative to each other.

5. The steering assembly of claim 4, wherein each tubular member has a common cross-sectional profile, the cross-sectional profile is a circle with a crescent recess, an oval with one axis of symmetry, an ellipse, or a discorectangle.

6. The steering assembly of claim 3, wherein the steering stem defines a plurality of tubular members configured to longitudinally slide relative to each other but restrict rotational movement relative to each other.

7. The steering assembly of claim 1, wherein a mounting assembly is coupled to the second end of the frame assembly, the mounting assembly configured to selectively mount to the wheelchair.

8. The steering assembly of claim 7, wherein the mounting assembly is configured to selectively mount to a rear axle of the wheelchair.

9. The steering assembly of claim 1, wherein the at least one cable extends from the steering device to a mounting assembly coupled to the second end of the frame assembly, the mounting assembly configured to selectively engage the wheelchair, wherein in response to the frame assembly being in the operational configuration and engaged with the wheelchair, actuation of the at least one cable is configured to disengage the mounting assembly from the wheelchair.

10. A steering assembly for a wheelchair comprising:
- a frame assembly defining a first end opposite a second end;
- a hinge assembly positioned in the frame assembly between the first end and the second end, the frame assembly defining a first frame member including the first end and a first portion of the hinge assembly, and a second frame member including the second end and a second portion of the hinge assembly;
- a steering device including a front wheel, the steering device coupled to the first end of the frame assembly;
- a mounting assembly coupled to the second end of the frame assembly, the mounting assembly configured to selectively mount to a mounting member of the wheelchair,
- wherein the hinge assembly is configured to actuate between a first configuration, where the frame assembly is in an operational configuration and the first frame member is axially aligned with the second frame member, and a second configuration, where the frame assembly is in a collapsed configuration and the first frame member is offset from the second frame member, and
- wherein in response to the mounting assembly being selectively mounted to the mounting member, the mounting assembly is electrically connected to a drive assist connected to the wheelchair, the drive assist being positioned rearward of the mounting member of the wheelchair.

11. The steering assembly of claim 10, wherein the drive assist is positioned rearward of the rear axle of the wheelchair.

12. The steering assembly of claim 10, wherein at least one cable extends through the frame assembly from the steering device to the mounting assembly, wherein in response to the frame assembly being in the collapsed configuration, a portion of the hinge assembly is configured to shield the at least one cable.

13. The steering assembly of claim 12, wherein the portion of the hinge assembly is a latch handle.

14. The steering assembly of claim 10, wherein a release cable extends through the frame assembly from an actuator positioned on the steering device to the mounting assembly, wherein in response to the frame assembly being in the collapsed configuration, a portion of the hinge assembly is configured to shield the release cable, and wherein in response to the frame assembly being in the operational configuration and mounted to the wheelchair, actuation of the actuator is configured to detach the mounting assembly from the mounting member of the wheelchair.

15. The steering assembly of claim 10, wherein the hinge assembly includes a latch handle, and in the second configuration the first frame member and the second frame member both extend from a common side of the latch handle.

16. A steering assembly for a wheelchair comprising:

a frame assembly including a first frame member and a second frame member;

a hinge assembly in the frame assembly between the first frame member and the second frame member, the hinge assembly includes a latch handle; and a steering device coupled to the first frame member of the frame assembly, the steering device including a handlebar operably connected to a front wheel by a steering shaft; and at least one cable extending from the steering device through at least a portion of the first frame member and at least a portion of the second frame member, wherein the hinge assembly is configured to pivot between a first configuration and a second configuration, wherein in the first configuration, the first frame member is aligned with the second frame member and the frame assembly is in an operational configuration, and wherein in the second configuration, the frame assembly is in a collapsed configuration such that the first frame member and the second frame member both extend from a common side of the latch handle, and the latch handle is configured to shield the at least one cable.

17. The steering assembly of claim 16, further comprising a mounting assembly coupled to the second frame member, the mounting assembly configured to selectively mount to the wheelchair.

18. The steering assembly of claim 17, wherein the at least one cable extending from the steering device through at least a portion of the first frame member and at least a portion of the second frame member to the mounting assembly.

* * * * *